Patented Oct. 4, 1932

1,880,959

UNITED STATES PATENT OFFICE

RUDOLPH JUNG, OF OFFENBACH-ON-THE-MAIN, GERMANY, ASSIGNOR TO GENERAL ANILINE WORKS, INC., OF NEW YORK, N. Y., A CORPORATION OF DELAWARE

PROCESS FOR PRODUCING NITROSO DIAZO SOLUTIONS

No Drawing. Application filed March 8, 1929, Serial No. 345,598, and in Germany March 15, 1928.

My present invention relates to a process of producing nitroso diazo solutions to be used for dyeing purposes, more particularly it relates to a process of preparing solutions containing N-nitroso-diazonium compounds of the diphenylamine series.

Diazo compounds of the diphenylamine series yield valuable blue shades when combined on the fiber with 2.3-hydroxynaphthoyl-arylamides. It has been found that the N-nitroso-diazo compounds have a higher combining power than the simple diazo compounds free from nitroso groups, and therefore the N-nitrosodiazo compounds of the diphenylamine series are advantageously used for preparing the dyestuffs. The nitroso group is split off from the complete dyestuffs by a suitable after-treatment of the dyed material.

In order to spare the dyer the manufacture of diazo compounds it is customary in the art to furnish him with ready-made diazo preparations. But solid nitrosodiazo preparations of the diphenylamine series cannot be produced on a technical scale as according to my experiments the nitroso groups are split off during the drying process.

I have now found that nitroso diazo solutions of the diphenylamine series can be produced from solid diazo preparations by adding to a solution of a solid diazo preparation of the diphenylamine series an alakali nitrite and a substance setting free nitrous acid from the nitrite. The addition of this acid substance is not necessary when the solid diazo preparation itself contains the sufficient amount of an acid.

In order to further illustrate my invention the following examples are given, but I wish it to be understood that I am not limited to the particular products nor reaction conditions mentioned therein; the parts are by weight:

*Example 1.*—A quantity of the acid diazonium sulfate of para-aminodiphenylamine corresponding to 184 parts of the base is dissolved in water. Then a solution of 69 parts of sodium nitrite is added while stirring. After a short time the N-nitroso-diphenylamine-4-diazonium salt is formed in the solution.

*Example 2.*—A solution of the double salt of zinc chloride and 4'-ethoxy-diphenylamine-4-diazoniumchloride corresponding to 228 parts of the base is mixed while stirring with a solution of 69 parts of sodium nitrite and with 105 parts of hydrochloric acid of 20° Bé. After a short time the N-nitroso-4'-ethoxy-diphenylamine-4-diazonium salt is formed in the solution.

*Example 3.*—A solution of 4'-methoxy-diphenylamine-4-diazonium chloride corresponding to 214 parts of the base is mixed while stirring with a solution of 69 parts of sodium nitrite and with a solution of 80 parts of oxalic acid. After a short time the N-nitroso-4'-methoxy-diphenylamine-4-diazonium salt is formed in the solution.

*Example 4.*—A solution of the benzene sulfonate of 4'-methyl-diphenylamine-4-diazonium corresponding to 198 parts of the base is mixed while stirring with a solution of 69 parts of sodium nitrite and with 60 parts of glacial acetic acid. After a short time the N-ntroso-4'-methoxy-diphenylamine-4-diazonium salt is formed in the solution.

*Example 5.*—A solution of the acid naphthalene-1.5-disulfonate of 3'-methyl-4'-chlorodiphenylamine-4-diazonium corresponding to 232,5 parts of the base are mixed while stirring with a solution of 69 parts of sodium nitrite. After a short time the N-nitroso-3'-methyl-4'-chlorodiphenylamine-4-diazonium salt is formed in the solution.

*Example 6.*—A solution of the double salt of zinc chloride and 4'-chloro-diphenylamine-4-diazoniumchloride corresponding to 218 parts of the base are mixed while stirring with a solution of 69 parts of sodium nitrite and with 120 parts of sodium bisulfate.

After a short time the N-nitroso-4'-chloro-diphenylamine-4-diazonium salt is formed in the solution.

I claim:

1. The process of preparing nitroso-diazo solutions to be used for dyeing purposes which comprises dissolving in water a solid diazo preparation of an amino-diphenylamine compound of the general formula:

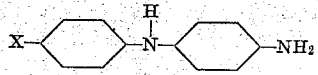

wherein X means hydrogen, halogen, an alkoxy or an alkyl group, and adding to this solution substances capable of producing nitrous acid.

2. The process of preparing nitroso-diazo solutions to be used for dyeing purposes which comprises dissolving in water a solid diazo preparation of an amino-diphenylamine compound of the general formula:

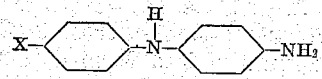

wherein X means hydrogen, halogen, an alkoxy or an alkyl group, and adding to this solution an alkali nitrite and a substance capable of setting free nitrous acid from the nitrite.

3. The process of preparing nitroso-diazo solutions to be used for dyeing purposes which comprises dissolving in water a solid diazo preparation of an amino-diphenylamine compound of the general formula:

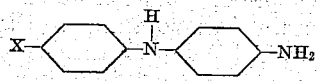

wherein X means hydrogen, Cl, the methyl or an alkoxy group, and adding to this solution an alkali nitrite and a substance capable of setting free nitrous acid from the nitrite.

4. The process of preparing a nitroso-diazo solution to be used for dyeing purposes which comprises dissolving in water a solid diazo preparation of 4-amino-4'-methoxy-diphenylamine and adding to this solution an alkali nitrite and a substance capable of setting free nitrous acid from the nitrite.

5. The process of preparing a nitroso-diazo solution to be used for dyeing purposes which comprises dissolving in water a quantity of 4'-methoxy-diphenylamine-4-diazonium chloride corresponding to 214 parts by weight of the base, mixing this solution with a solution of 69 parts by weight of sodium nitrite and then adding thereto a solution of 80 parts by weight of oxalic acid.

In testimony whereof, I affix my signature.

RUDOLPH JUNG.